(12) United States Patent
Yamamoto et al.

(10) Patent No.: US 6,311,151 B1
(45) Date of Patent: Oct. 30, 2001

(54) SYSTEM, PROGRAM, AND METHOD FOR PERFORMING CONTEXTUAL SOFTWARE TRANSLATIONS

(75) Inventors: Keiichi Yamamoto; Kin Hung Yu; David Bruce Kumhyr, all of Austin, TX (US); Stanford Louis Yates, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/362,617

(22) Filed: Jul. 28, 1999

(51) Int. Cl.[7] .............................. G06F 17/20; G06F 15/00
(52) U.S. Cl. ................................... 704/8; 707/530
(58) Field of Search ..................... 704/2–7, 8; 707/530, 707/536, 513; 717/1, 4, 8

(56) References Cited

U.S. PATENT DOCUMENTS

| | | | |
|---|---|---|---|
| 5,243,519 | * 9/1993 | Andrews et al. | 704/8 |
| 5,251,130 | * 10/1993 | Andrews et al. | 704/8 |
| 5,583,761 | 12/1996 | Chou | 395/798 |
| 5,652,884 | * 7/1997 | Palevich | 704/8 |
| 5,664,206 | * 9/1997 | Murow et al. | 704/8 |
| 5,678,039 | 10/1997 | Hinks et al. | 395/604 |
| 6,003,050 | * 12/1999 | Silver et al. | 707/536 |

OTHER PUBLICATIONS

Separating Strings from Standard Graphical User Interface Resources for Translation and Builds, IBM Technical Disclosure Bulletin, vol. 39, No. 03, Mar. 1996, pp. 217–228.
Tool to Aid Translation of Web Pages Into Different National Languages, IBM Technical Disclosure Bulletin, vol. 41, No. 01, Jan. 1998, pp. 223–224.

* cited by examiner

Primary Examiner—Patrick N. Edouard
(74) Attorney, Agent, or Firm—Marilyn Smith Dawkins; Bracewell & Patterson, L.L.P.

(57) ABSTRACT

A system, method, and program for providing language translators with contextual information for the text to be translated. The translator is presented with a graphical user interface in the base language, and can then interactively translate each text label on the screen. Because the translation is performed on the text in the proper context, the time and expense of Translation Verification Testing is reduced or eliminated. The contextual presentation of the text is accomplished by storing contextual information in localization files, along with the text to be translated. When the translation tool is run, it retrieves both the text to be translated and the contextual information from the localization files, and uses this information to create a GUI display which is similar to that of the original program. The translator can then translate the text in the proper context, and the translation is stored to disk.

21 Claims, 6 Drawing Sheets

SYSTEM, PROGRAM, AND METHOD FOR PERFORMING CONTEXTUAL SOFTWARE TRANSLATIONS

BACKGROUND OF THE INVENTION

1. Cross Reference to Related Applications

This application shares common text and figures with commonly assigned, copending applications 09/362,615, "Introspective Editor System. Program, and Method For Software Translation", 09/362,616, "Introspective Editor System. Program, and Method For Software Translation Using a Facade Class", 09/362,617, "System, Program, and Method For Performing Contextual Translations", which are hereby incorporated by reference.

2. Technical Field

The present invention generally relates to tools for developing software for international use and in particular to multi-language software development. Still more particularly, the present invention relates to an improved system and method for performing language translation in computer software.

3. Description of the Related Art

Software Internationalization

As computers have become more prevalent, it has become desirable for software developers to be able to market their products to those people who do not speak the native language of the software developers. In particular, it is desirable that software developed in the English language be available to those persons, both in the United States and in the rest of the world, that do not speak English. Accordingly, many software applications that are developed in English are later translated for use by non-English speakers.

The process of translating a software package into another (or more than one other) language is time-consuming and expensive. Each text message, menu, and button must be translated to allow the user to operate the program. The most direct way to do this is to search the entire program source code for every text string, i.e., every string of characters that would be displayed to the user, and translating each of these to the new language.

This approach has several problems. One problem is that the use of this method means that the software must be specifically translated and compiled for each intended language. This, of course, is an expensive process in itself, and means that any change in the source code requires each language version of the code to be edited and recompiled.

FIG. 2 shows an example of hardcoded labels in a Java application. In this Figure, window 200 shown with two graphical user interface (GUI) "buttons" 210 and 230. These buttons are created using a hard-coded Java "JButton" call; for example, code-line 220 calls Jbutton with the string argument "Ok", creating button 210 with text label "Ok". Similarly. code-line 240 calls JButton with the string argument "Cancel", creating button 230 with text label "Cancel". To translate a software application which uses hard-coded strings as in FIG. 2, each line of the code must be parsed and each displayed string must be individually translated for each target language.

One solution to this problem is the use of separate localization files, in which the text strings that are to be displayed are stored separately from the executable code itself. As the software is executed, the text for every given display screen is simply read from the localization files, in whichever language is stored in the file. In this manner, the text in the localization file can be translated without disturbing the executable, and the executable can be changed or replaced without disturbing the translated text (except, of course, that if the text to be displayed changes, the corresponding entries in the localization files must also be changed). The localization files may be in any number of formats, including compiled message catalogs, Java resource bundles, HTML files, and many others.

The use of localization files provides an easy way to do multiple translations, but presents an additional problem in that the translation is performed on text isolated in a separate file, without any kind of context for the translator. Because this is the case, the translation will often contain errors which would not be present if the translator had been able to perform the translation according to the context in which the text appears.

However the translation is handled, each screen of the program in operation must then be proofread to ensure that the translated text is properly displayed and properly translates the text in the context of the display. Therefore, it has become common practice to hire individuals with backgrounds in other languages to proofread each screen of the translated program to detect any display, grammar, or other translation errors. This second phase is called Translation Verification Testing (TVT).

FIG. 3 shows a chart of a translation and testing cycle according to conventional methods. A typical Company B, located in Country B, translates (340) the localization files that were sent to it. Translations are done without context, and therefore are error prone by design. The translated localization files are sent to Company A, located in Country A, where they are built (310) and packaged (320) into the software application. This software application is shipped back to Company B, who will then test (330) the translations in context. Errors are found and new translation files are generated (340) and the process repeats itself until no more errors are found.

According to this conventional process, each time an error is corrected or a change made in translation in Country B, the product must be rebuilt and repackaged in Country A before it is retested. Because of this, the TVT process is necessarily an expensive and time-consuming process. It would therefore be desirable to provide a means to provide additional information to the translator, and contextual information in particular, so that the initial translation is as accurate as possible. By doing so, the cost and time required for TVT testing can be reduced or eliminated.

Java

Java is two things: a programming language and a platform. In one aspect, Java is a high-level programming language, and is unusual in that each Java program is both compiled and interpreted, to make it accessible to many platforms. Java is also a software-only platform that runs on top of other, hardware-based platforms. The Java platform has two components; the Java Virtual Machine (Java VM), and the Java Application Programming Interface (Java API).

Java VM is the base for the Java platform and is ported onto various hardware-based platforms. The Java API is a large collection of ready-made software components that provide many useful capabilities, such as graphical user interface (GUI) widgets. The Java API is grouped into libraries (packages) of related components.

JavaBeans brings component technology to the Java platform. JavaBeans API supports reusable, platform-independent components. Using JavaBeans-compliant application builder tools, components can be combined into applets, applications, or composite components. JavaBean components are known as Beans.

SUMMARY OF THE INVENTION

It is therefore one object of the present invention to provide an improved tool for developing software for international use.

It is another object of the present invention to provide an improved tool for multi-language software development.

It is yet another object of the present invention to provide an improved system and method for performing language translation in computer software.

The above as well as additional objectives, features, and advantages of the present invention will become apparent in the is following detailed written description.

A more efficient translation process is made possible by providing a system and method for providing language translators with contextual information for the text to be translated. The translator is presented with a graphical user interface in the base language, and can then interactively translate each text label on the screen. Because the translation is performed on the text in the proper context, the time and expense of Translation Verification Testing is reduced or eliminated. The contextual presentation of the text is accomplished by storing contextual information in localization files, along with the text to be translated. When the translation tool is run, it retrieves both the text to be translated and the contextual information from the localization files, and uses this information to create a GUI display which is similar to that of the original program. The translator can then translate the text in the proper context, and the translation is stored to disk.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
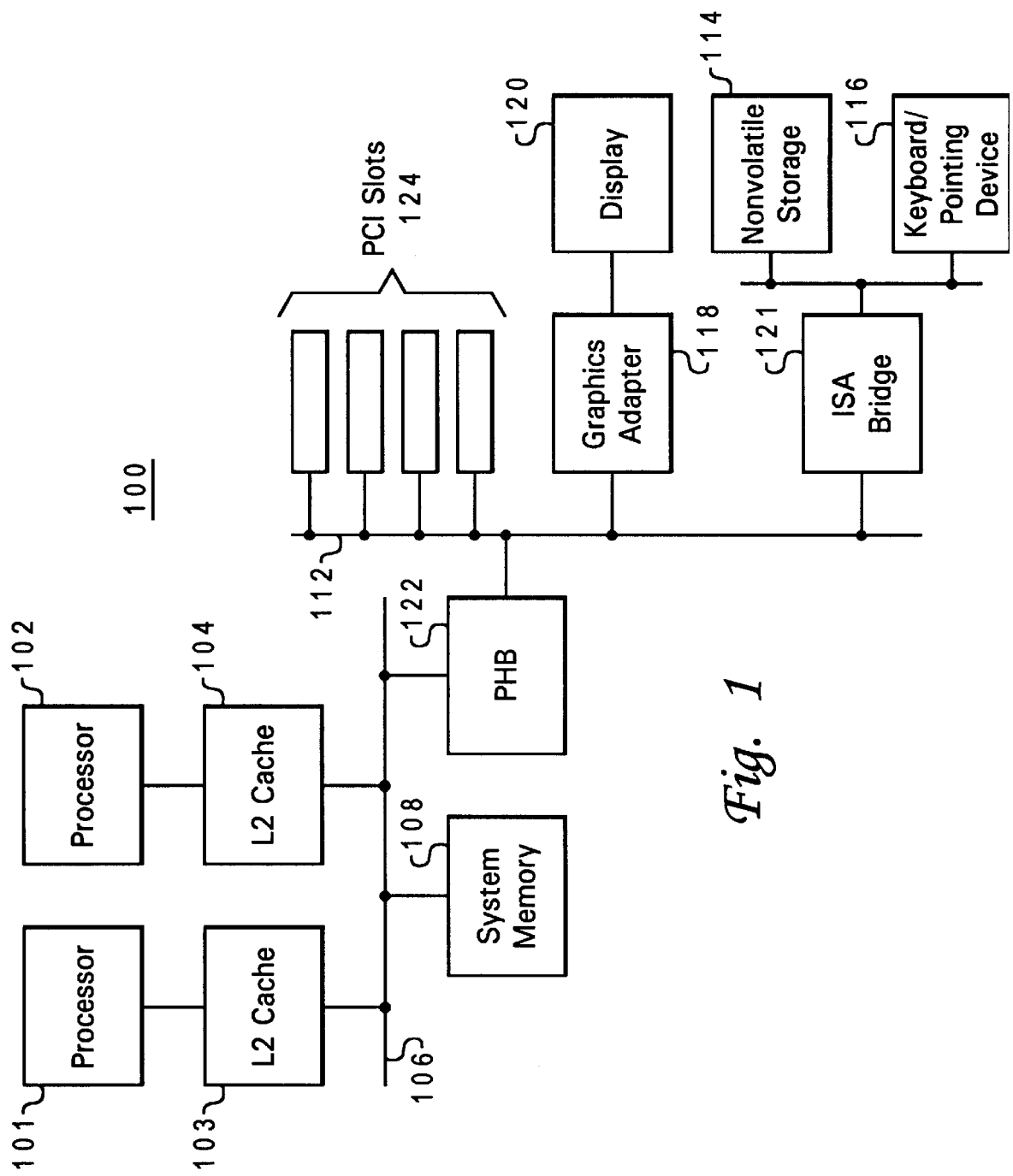
FIG. 1 depicts a data processing system in which a system in accordance with a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, one of the computers available from International Business Machines Corporation of Armonk, N.Y. Data processing system 100 includes processors 101 and 102, which in the exemplary embodiment are each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one bus to the other. In the exemplary embodiment, data processing system 100 includes graphics adapter 118 connected to I/O bus 112, receiving user interface information for display 120. Peripheral devices such as nonvolatile storage 114, which may be a hard disk drive, and keyboard/pointing device 116, which may include a conventional mouse, a trackball, or the like, are connected via an Industry Standard Architecture (ISA) bridge 121 to I/O bus 112. PHB 122 is also connected to PCI slots 124 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the exemplary figures below are provided solely as examples for the purposes of explanation and are not intended to imply architectural limitations. In fact, this method and system can be easily adapted for use on any programmable computer system, or network of systems, on which software applications can be executed.

A typical translation process for a software application is comprised of two phases. In the first phase, the human language text for the application's human text elements are captured in text files and delivered to translators for translation. These translators have not seen the application and thus have no contextual information about the actual usage of the text being translated. Thus the translation process is, by design, error prone. To resolve these errors and to validate the translated text, the second phase, Translation Verification Testing, is performed.

The preferred embodiment simplifies the translation process by allowing the developer to merge the two phases of the translation process. This is accomplished by providing the translator with direct contextual information about the item being translated. As a result, the costly and time-consuming TVT phase can be reduced or eliminated.

According to the preferred embodiment, an introspective editor is provided which allows direct editing of the interface components by a translator, saving the results of the translation in a text file, which, in the preferred embodiment, is a Java resource bundle. This provides the translator with necessary context to perform an accurate translation, and so the translation can be much more accurate.

Figure 3:
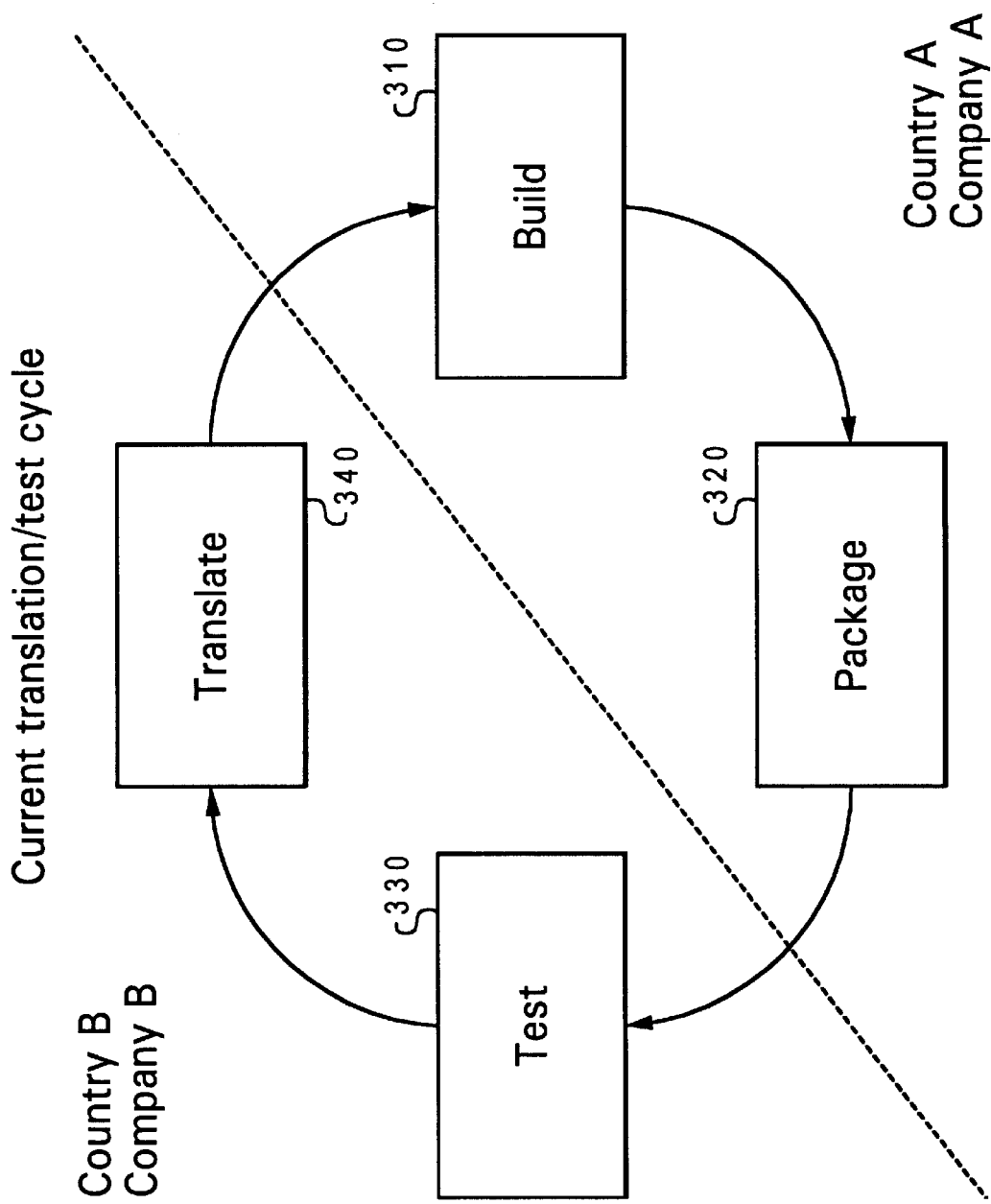
FIG. 3 depicts a block diagram of a translation and testing process according to conventional methods.
Figure 4:
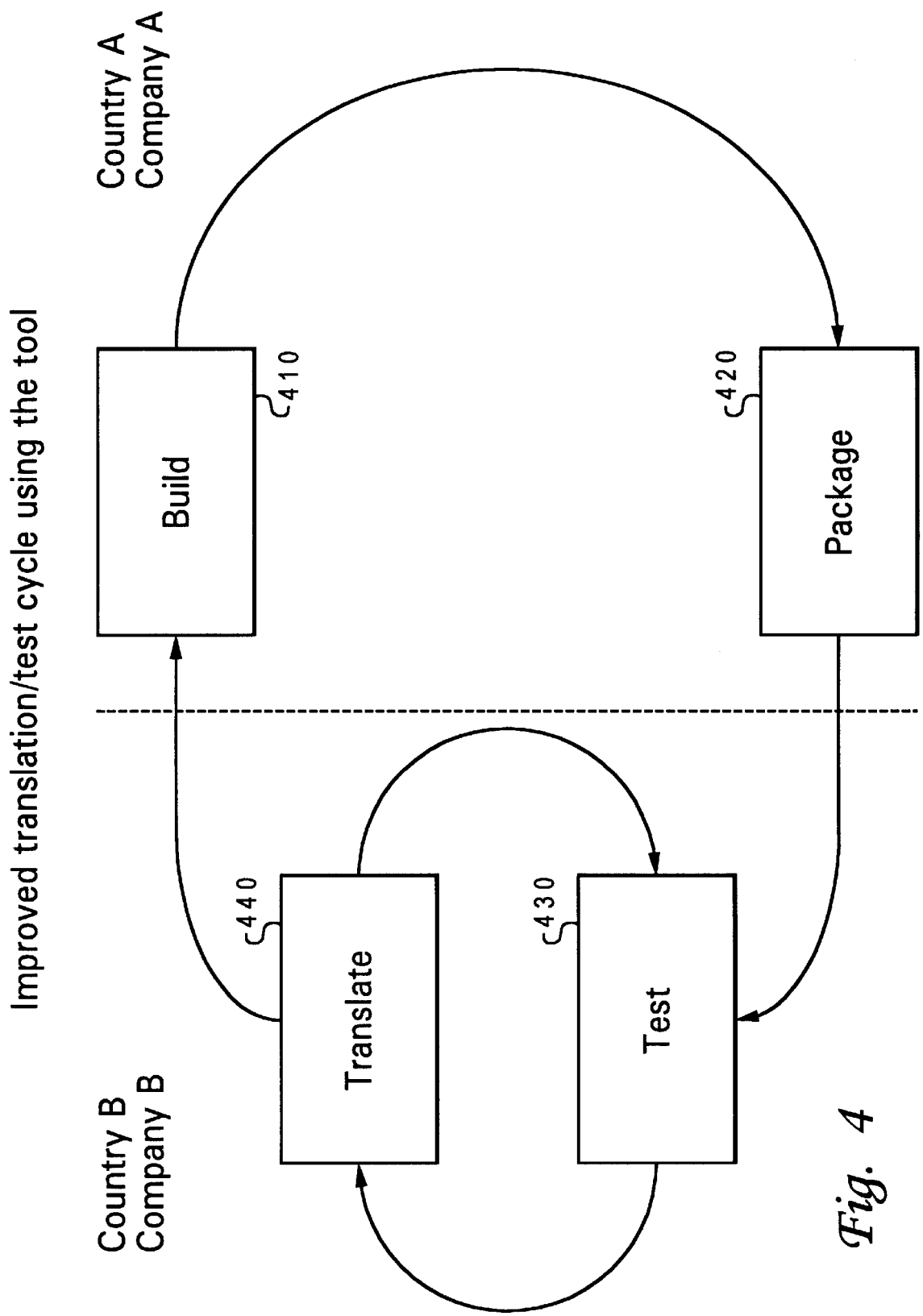
FIG. 4 is a block diagram of a translation and testing process in accordance with a preferred embodiment of the invention.

With reference now to FIG. 4, a block diagram of an improved translation and testing process according to the preferred embodiment. Company A, located in Country A, builds (410) and packages (420) the localization files that are to be translated and ships them to Company B, located in Country B. Built into the localization files are the necessary context information to support in context translation, in the form of a mock environment. Company B will then execute the mock environment to test (430) for translation errors and make any necessary retranslation (440). Unlike the case described in FIG. 3, above, because the present embodiments allow the translations to be performed in context and stored locally, Company B can immediately retest the translations (430), without shipping the product back to Country A to rebuild first. As a result, the translation and testing phase is much more efficient than according to conventional means.

Of course, it is possible that the testing phase in Country B will reveal other errors, such as programming problems, which are not corrected in the translation problems. In this case, the application is shipped back to Company A to be corrected, as in conventional processes.

In accordance with several embodiments described herein, the translator will actually execute the software application which he is translating, and the disclosed embodiments provide means for the translator to directly select text from the screen and edit it in real time. Because the translator is seeing in the mock environment an exact emulation of the actual application as the end-user will see it, the translations will be much more accurate.

In use, the introspective editor, according to the preferred embodiment, is presented as a "pop-up" editor window to accompany the text to be translated. For example, if the text to be translated is found on a "button" on a windows-based graphical user interface (GUI), then the localization file will store basic contextual information regarding the button along with the text itself. When the text is to be translated, the contextual information is read, and a button, with the original text, is displayed on the screen. When the translator selects the button, an editor pop-up window is displayed, and the translator will enter the translated text for that button. The editor will close, and the translated text will be stored in a localization file, which is either in a new file or by overwriting the original text in the original file. Thus, the complete translation has been performed in the context in which the button will appear in the final application.

In the preferred embodiment, a "ctrl-alt-shift" key combination is used to signify that the displayed text is to be translated. When the GUI window is displayed, by pressing "ctrl-alt-shift" and "right-clicking," with a mouse or other pointing device, on a text label in the display, the translator indicates that the text label is to be translated. An editor window opens, and the translator can enter new text directly into the editor window. When the translator is finished, the new text is stored for future use.

By directly editing the text elements in the software application's user interface, and by providing context to the translators, this method can eliminate the TVT phase of the translation process, thus reducing time and errors.

The editor is referred to as an "introspective" editor because, in this embodiment, it utilizes the introspection properties of the Java programming language to view and edit controls with "setText" and "getText" methods. While some aspects of Java , JavaScript, JavaBeans, and other Java-related tools are described herein, other material is available from Sun Microsystems, and can be found (as of the filing date of this application) at http://java.sun.com.

Each Java Bean component has its own features, including its properties, methods, and events. These features can be examined by other Beans by a process known as introspection. Beans support introspection in two ways:

2 By adhering to specific rules, known as design patterns, when naming Bean features. The java.beans.Introspector class examines Beans for these design patterns to discover Bean features. The Introspector class relies on the core reflection API; and 3 By explicitly providing property, method, and event information with a related Bean Information class. A Bean information class implements the BeanInfo interface. A BeanInfo class explicitly lists those Bean features that are to be exposed to application builder tools.

Properties are a Bean's appearance and behavior characteristics that can be changed at design time. Builder tools introspect on a Bean to discover its properties, and expose those properties for manipulation.

Beans expose properties so they can be customized at design time. Customization is supported in two ways: By using property editors, or by using more sophisticated Bean customizes. Beans use events to communicate with other Beans. A Bean that wants to receive events (a listener Bean) registers its interest with the Bean that fires the event (a source Bean). Builder tools can examine a Bean and determine which events that Bean can fire (send) and which it can handle (receive).

Persistence enables Beans to save and restore their state. Once you've changed a Beans properties, you can save the state of the Bean and restore that Bean at a later time, property changes intact. JavaBeans uses Java Object Serialization to support persistence.

A Bean's methods are no different than Java methods, and can be called from other Beans or a scripting environment.

Although Beans are designed to be understood by builder tools, all key APIs, including support for events, properties, and persistence, have been designed to be easily read and understood by human programmers as well.

The Introspector class provides a standard way for tools to learn about the properties, events, and methods supported by a target Java Bean. For each of those three kinds of information, the Introspector will separately analyze the bean's class and superclasses looking for either explicit or implicit information and use that information to build a BeanInfo object that comprehensively describes the target bean.

The preferred embodiment provides a means to use class field values to allow the translation of software text. Each text label in a software display is stored as a class object.

Figure 2:
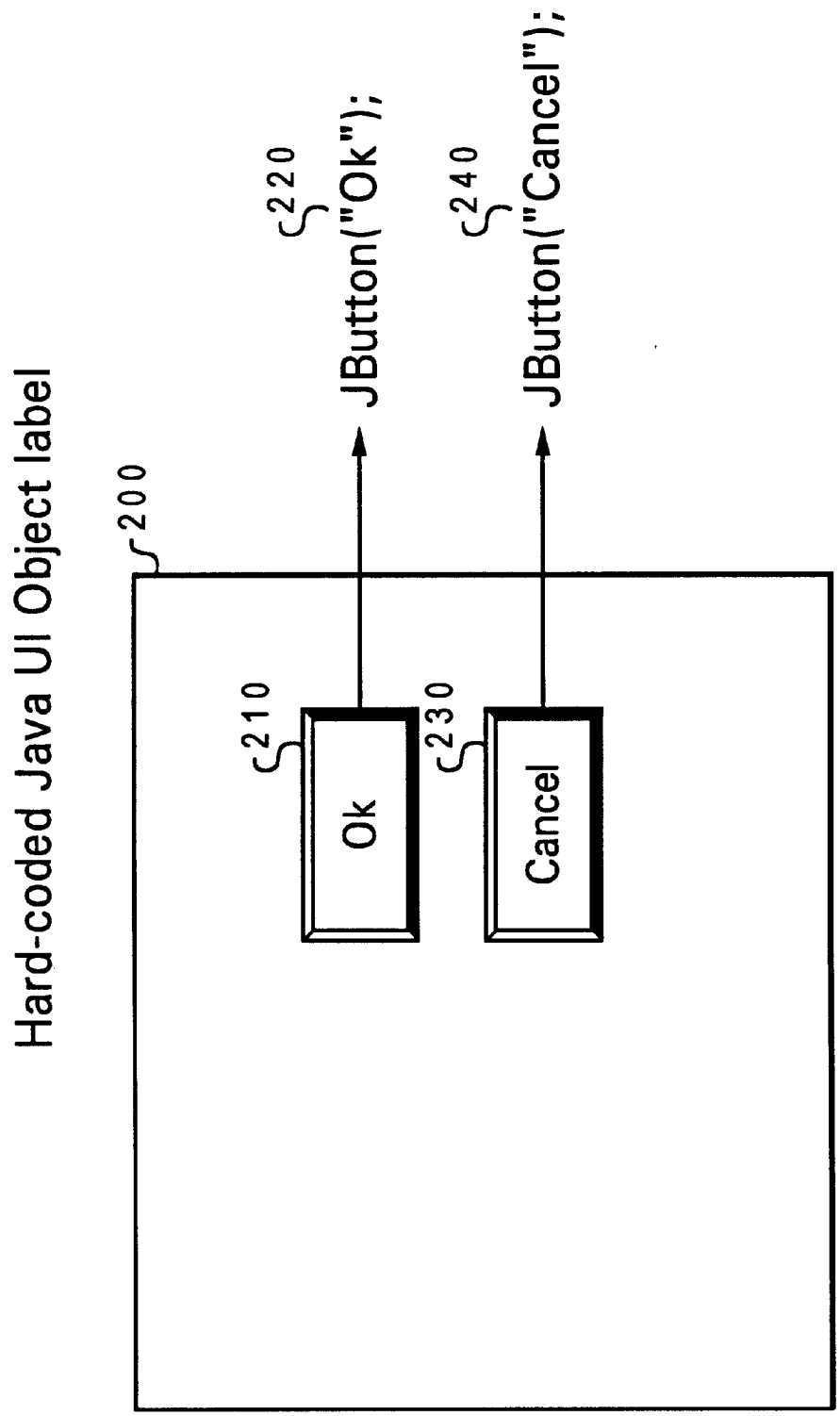
FIG. 2 is an example of a GUI display with hard-coded text.
Figure 5:
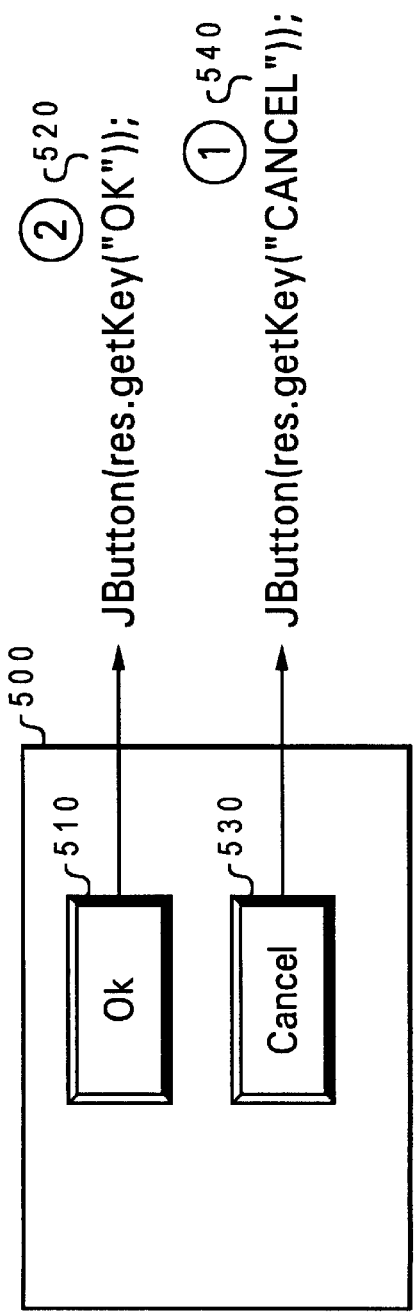
FIG. 5 depicts an example of a GUI display using Java resource files, in accordance with a preferred embodiment of the invention.
Figure 5:
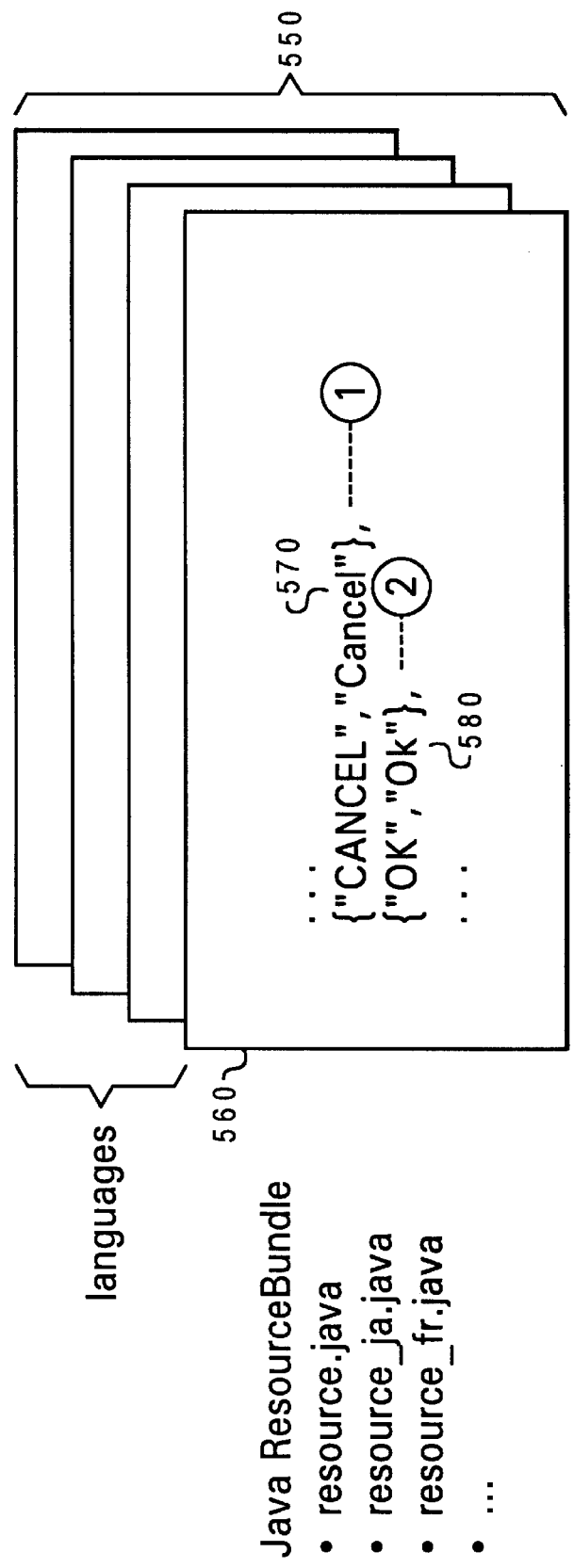

In this embodiment, the actual text to be displayed on, for example, a GUI button, is not hard-coded but is stored in a Java ResourceBundle localization file. With reference now to FIG. 5, and example of button labels being displayed using Java resource bundles is shown. In this Figure, window 500 is shown with GUI buttons 510 and 530. Note that this window corresponds to window 200 of FIG. 2. Here, however, button 510 is created using a Java Jbutton call which refers to a ResourceBundle.

In this example, the command "JButton(res.getString ("OK")) 540 creates a GUI button, and labels it by doing a resource file lookup for the text that should correspond to an "OK" button. Java resource files are depicted collectively as 550, and an English language reference file is shown as 560. In file 560, entry 580 indicates that the text that corresponds to an "OK" button is "Ok". Therefore, command 520 creates a GUI button with the text "Ok". Note that in this example, for the sake of clarity, button names are shown in upper case, and button text labels are shown in mixed case.

Similarly, the command "JButton(res.getString ("CANCEL")) 540 creates a GUI button, and labels it by doing a resource file lookup for the text that should correspond to an "CANCEL" button. In file 560, entry 570 indicates that the text that corresponds to an "CANCEL" button is "Cancel". Therefore, command 520 creates a GUI button 530 with the text "Cancel". Of course, the actual corresponding text in the resource file 560 can be anything; the entry 570 could read {"CANCEL", "Stop"}, which would cause a button labeled "Stop" to be created every time command 540 was executed. Of course, this approach is not limited to GUI buttons, but may be used to look up any displayable text from the localization resource files.

Since the resource files store the text to be displayed as Java objects, the introspective properties of the Java environment can be used to allow the translators to directly edit the application text using a pop-up editor. Each text entry in the Java resource files is stored as a Java JComponent, with the resource bundle name and key attached as properties to each JComponent text entry. When the translator examines a text object, these properties are introspected along with the JComponent hierarchy, so the translator can edit the correct text entry.

When the pop-up editor is activated, a getText call is made to the resource file object, which returns the present text to the editor. This text is displayed to the translator, who then may edit it. After the translation/edit is complete, the new text is stored in the object using a setText call.

Finally, the object, with the new text, is stored back into a Java ResourceBundle file. Thereafter, the software application can be executed using the modified objects, which will then show the translated text on the display.

According to the preferred embodiment, a translation tool is provided which allows the translator to edit the display text of a software application without ever executing the application. For example, if the text to be translated is found on a "button" on a windows-based graphical user interface (GUI), then the localization file will store basic contextual information regarding the button along with the text itself. When the text is to be translated, the contextual information is read, and a button, with the original text, is displayed on the screen in accordance with the contextual information. When the translator selects the button, an editor pop-up window is displayed, and the translator will enter the translated text for that button. The editor will close, and the translated text will be stored in a localization file (either in a new file or overwriting the original text in the original file). Thus, the complete translation has been performed in the context in which the button will appear in the final application.

The translation tool uses Java introspection to recreate the proper context of the textual label. When this translation tool is executed, it will instantiate a UI component of the target application, and introspect its component hierarchy. It then displays this component hierarchy in a frame, without actually running the application. When it has done so, the translation tool then allows the user to edit the components, add additional event handlers, etc.; and serializes and saves the edited components. In this manner, the context of the text in the original application is provided to the translator.

The translatable GUI components are preferably, in this embodiment, Swing-based Java Beans (i.e., they derive from JComponent, are instantiable from a no-parameter constructor, and are able to be displayed when created in this fashion). Therefore, translators are not required to actually run the target application but still have the ability to view its screens and translate its strings from within the translation editor tool.

One great advantage of this embodiment over the embodiments discussed above is that complex, multi-tiered applications can have significant back-end (i.e. server, database, communications, security, etc.) components or additional hardware requirements, making it impractical for the translator to set up and run the full-blown application. According to this embodiment, translators can view and translate the target application's screens while running the editor on a stand-alone, mid-range PC.

The translator is not required to actually execute the software application for which he is translating; rather, the localization files themselves contain contextual data related to each text string, to allow the translation to be done fully in context.

Figure 6:
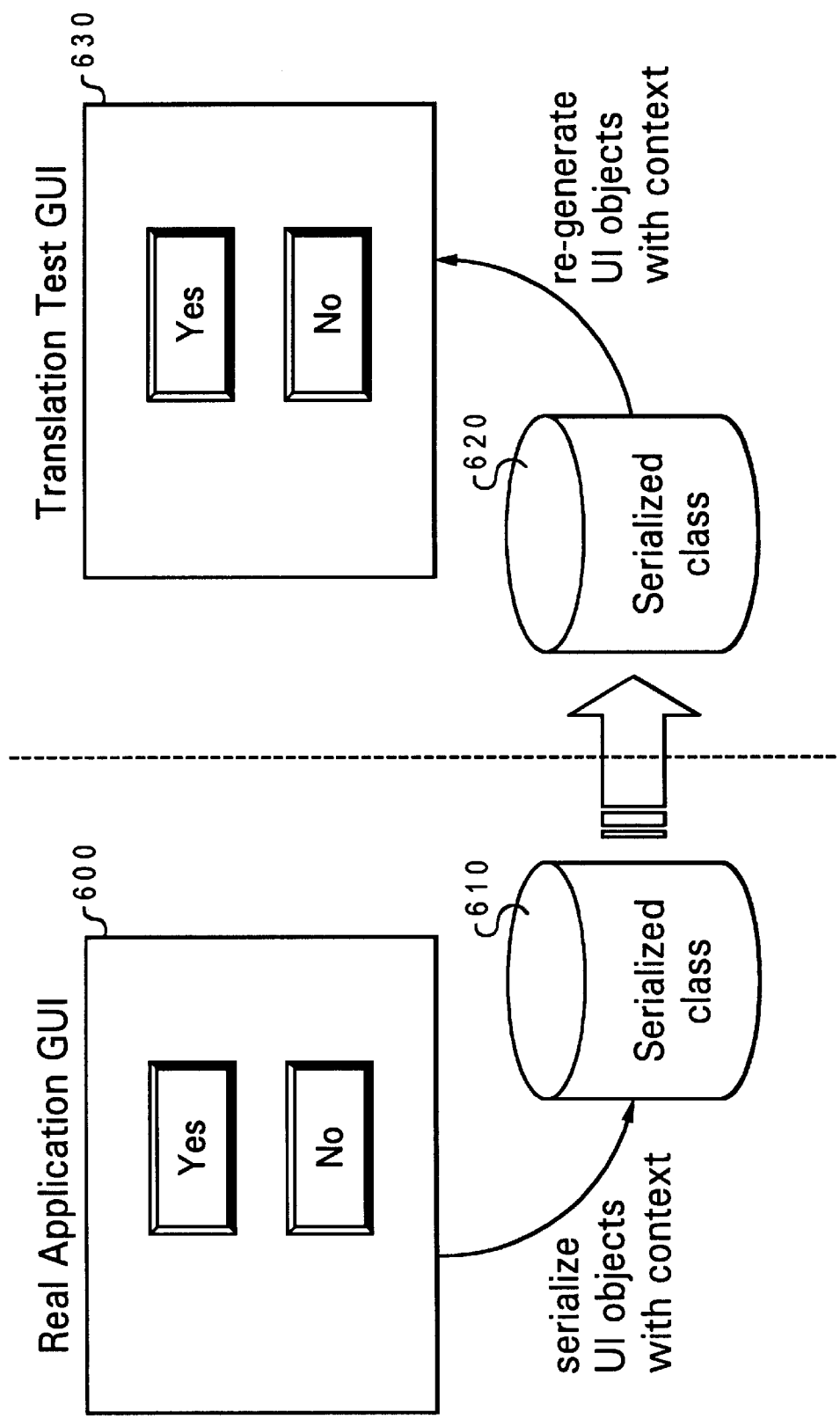
FIG. 6 depicts a block diagram of a contextual editor in accordance with a preferred embodiment of the invention.

With reference now to FIG. 6, a block diagram of an application and a contextual translation tool is shown. Here, after the application 600 is built, the UI objects, combined with contextual information, is stored in one or more files 610. A copy of these files 620 is sent to the translators. The translators will then execute the contextual translation tool 630, which will use the data in files 620 to build displays similar to those of the original application 600. The translator may then translate the text of the displays in the correct context, to provide a much more accurate and efficient translation process, with respect to prior techniques. The edited text can be stored back into files 620, which can then be read by the original application 600.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention. Furthermore, it will be understood that while specific data structures, functions, and languages have been discussed, the disclosed techniques may be readily adapted to other programming environments without departing from the scope of the invention.

What is claimed is:

1. A method for editing textual data for a software program, comprising:
    storing a first textual data for a non-data, user interaction portion of a user interface, together with associated contextual data identifying a location and display form for the first textual data within the user interface, separately from functional components for a software program utilizing the user interface;
    utilizing the first textual data and the associated contextual data to generate a display of the user interface, wherein the display includes the first textual data displayed according to the contextual data;
    receiving a second textual data to substitute for the first textual data as an input from a user while the user interface is being displayed;
    storing the second textual data in a form enabling a subsequent display of the user interface with the second textual data in place of the first textual data when the software program is executed.

2. The method of claim 1, wherein the form in which the second textual data is stored is a localization file on a computer storage medium.

3. The method of claim 1, wherein the second textual data is a translation of the first textual data from a first human language to a second human language.

4. The method of claim 1, wherein the contextual data includes graphical user interface object data.

5. The method of claim 1, wherein the contextual information includes graphical user interface object data for a user interface display object containing the first textual data.

6. The method of claim 1, wherein the contextual data includes a reference to a Java resource bundle containing the first textual data and a key associated with the first textual data.

7. The method of claim 1, wherein the display of the user interface generated utilizing the first textual data and the associated contextual data includes the first textual data as the first textual data appears when the software program is executed.

8. A computer system having at least a processor, accessible memory, and an accessible display, the computer system comprising:

means for storing a first textual data for a non-data, user interaction portion of a user interface, together with associated contextual data identifying a location and display form for the first textual data within the user interface, separately from functional components for a software program utilizing the user interface;

means for utilizing the first textual data and the associated contextual data to generate a display of the user interface, wherein the display includes the first textual data displayed according to the contextual data;

means for receiving a second textual data to substitute for the first textual data as an input from a user while the user interface is being displayed;

means for storing the second textual data in a form enabling a subsequent display of the user interface with the second textual data in place of the first textual data when the software program is executed.

9. The system of claim 8, wherein the form in which the second textual data is stored is a localization file on a computer storage medium.

10. The system of claim 8, wherein the second textual data is a translation of the first textual data from a first human language to a second human language.

11. The system of claim 8, wherein the contextual data includes Java component information.

12. The system of claim 8, wherein the contextual data includes a reference to a Java resource bundle containing the first textual data.

13. The system of claim 8, wherein the contextual data includes a key associated with the first textual data.

14. The system of claim 8, wherein the display of the user interface generated utilizing the first textual data and the associated contextual data includes the first textual data as the first textual data appears when the software program is executed.

15. A computer program product having computer readable program code on a computer usable medium, comprising:

instructions for storing a first textual data for a non-data, user interaction portion of a user interface, together with associated contextual data identifying a location and display form for the first textual data within the user interface, separately from functional components for a software program utilizing the user interface;

means for utilizing the first textual data and the associated contextual data to generate a display of the user interface, wherein the display includes the first textual data displayed according to the contextual data;

means for receiving a second textual data to substitute for the first textual data as an input from a user while the user interface is being displayed;

means for storing the second textual data in a form enabling a subsequent display of the user interface with the second textual data in place of the first textual data when the software program is executed.

16. The computer program product of claim 15, wherein the form in which the second textual data is stored is a localization file on a computer storage medium.

17. The computer program product of claim 15, wherein the second textual data is a translation of the first textual data from a first human language to a second human language.

18. The computer program product of claim 15, wherein the contextual data includes Java component information.

19. The computer program product of claim 15, wherein the contextual data includes a reference to a Java resource bundle containing the first textual data.

20. The computer program product of claim 15, wherein the contextual data includes a key associated with the first textual data.

21. The computer program product of claim 15, wherein the display of the user interface generated utilizing the first textual data and the associated contextual data includes the first textual data as the first textual data appears when the software program is executed.

* * * * *